Figure 1:
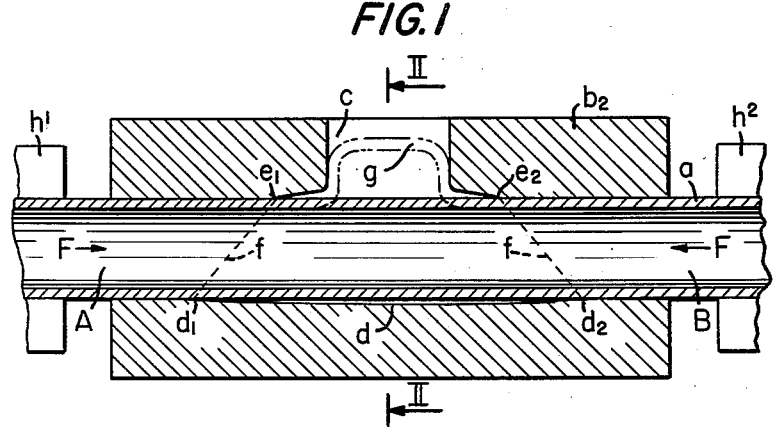

Aug. 6, 1963            A. HUET            3,099,880

PROCESS OF FORMING A BULB ON A STRAIGHT METAL TUBE

Original Filed June 28, 1956

INVENTOR.
ANDRE HUET

BY *Robert E. Burns*

ATTORNEY 3,099,880
PROCESS OF FORMING A BULB ON A STRAIGHT
METAL TUBE
André Huet, 48 Ave. du President Wilson,
Paris 16, France
Original application June 28, 1956, Ser. No. 594,474, now
Patent No. 3,030,902, dated Apr. 24, 1962. Divided
and this application Sept. 29, 1961, Ser. No. 141,845
Claims priority, application France Aug. 2, 1955
1 Claim. (Cl. 29—544)

This invention relates to the manufacture of tubular elements and is more particularly concerned with a process of forming bulbs or excrescences on straight metal tubes.

It has already been proposed, in order to obtain an eccentric bulge or bulb on a straight tube, i.e. a unilateral or asymmetric swelling in the wall of a tube, to subject the tube, previously heated, to an axial compression stress in a die which has an opening into which the extruded metal flows to define the bulb. In this known process, the inside of the tube is filled, for example with sand, or a mandrel of the same calibre as the internal section of the tube is placed in the latter, so that the wall of the tube, held between the mandrel and the die, can be forced only towards the outside, i.e. into the opening in the die.

I have unexpectedly found that it is possible to omit any kind of filling, and to omit the use of a mandrel inside the tube, if axially spaced apart portions of the tube are confined to prevent radial expansion of these portions and at least one surface area of a second portion of said tube intermediate said first spaced-apart portions is freed from radial confinement to allow radial expansion of the second portion, and axial pressure is applied to the tube directed inwardly toward the second portion. In this way the bulb is formed in the second portion while the first-named portions of the tube are held against expansion by the pressure. In this operation, different surface areas of the second portion are freed from radial confinement by varying amounts with one surface area being entirely free of radial confinement and the remaining surface areas being sufficiently free to prevent chilling of the tube blank prior to application of the axial pressure. To facilitate the above-described operations, the die, instead of conforming in size to the external diameter of the tube, is slightly additionally hollowed out to a diameter greater than that of the tube in the region corresponding to the extrusion of the metal at the time of the compression. The effect of this additional hollowing out can be explained by the fact that, because of the hollowing out, the tube, previously heated and placed in the die, does not come into contact with the die in the region to be treated, and, consequently, remains hotter in this region than in the adjoining areas, which cool on contact with the die. The resulting difference in expansion causes the hotter part of the region of the tube which is to be extruded to retain a diameter very slightly greater than in the adjoining parts, so that the swelling of the tube is already started in the right direction, i.e. away from the axis, and, without any need for providing a mandrel in the tube, the axial compression on the tube which follows produces the displacement of the metal away from the axis, i.e. into the opening in the die. Furthermore, the extrusion of the metal is effected more easily and rapidly because the tube remains hotter in the treated region and a larger bulb is obtained. In addition, it is possible, when necessary, during the extrusion operation, to pass hot gases all around the tube during the compression to maintain its temperature. Since there is no mandrel, it is even possible to dispose inside the tube a bank of heaters to maintain the treated region at the desired temperature during the operation.

The additional hollowing out of the die to facilitate the carrying out of the process is slight, e.g. of the order of a millimeter for tubes of 50 mm. external diameter, and it is found, after the compression is completed, that the thickness of the wall of the tube opposite the bulb is only slightly increased.

Figure 2:
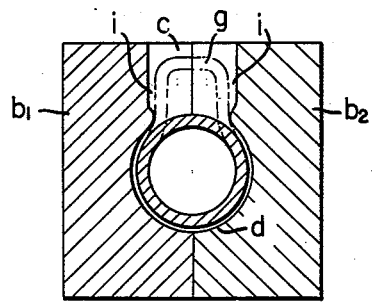

The following description, taken with reference to the accompanying drawing, given merely by way of example, will make clear the manner in which the invention is to be carried out. In the drawing, FIG. 1 shows in longitudinal section the tube placed in the die for carrying out the process of this invention;

FIG. 2 is a section taken on the line II—II of FIG. 1.

To produce the unilateral or eccentric bulb required on the tube $a$, a die such as shown in the drawing is suitably used. This die is preferably in two pieces, $b^1$ and $b^2$, having an internal diameter corresponding to the external diameter of tube $a$, and having a lateral opening $o$ of the same size as the bulb which it is desired to form on the tube. In addition, the cavity in the die $b^1$, $b^2$ for holding the tube $a$ has an additional hollowing out $d$ in the region of the tube where the bulb is required, i.e. as will be seen in FIG. 1 and FIG. 2, the internal diameter of the cavity in the die is very slightly larger in this portion than the external diameter of tube $a$. This cavity $d$ is again reduced to the external diameter of the tube $d^1$, $d^2$ at a predetermined distance from each side of the opening $c$ in the die, and affects the entire circumference of the tube $a$. However, on the side of the opening $c$, as can be seen in FIG. 1, the cavity extends only from $e^1$ to $e^2$ over a length less than on the opposite generatrix, the hollowed out contour being represented by the dotted lines $f$ in FIG. 1.

After the tube has been brought to the required temperature, it is placed in the die, and the part of the tube to be treated, not coming into direct contact with the die $b^1$, $b^2$, remains hotter than the regions A, B of the tube which are situated on either side. This results in a very small difference in expansion which produces, in the middle region of the tube, a diameter greater than that in the regions A, B, hence an incipient swelling which, when the axial pressure is applied in the direction of the arrows F—F, has the effect that the swelling already started will be continued in the direction away from the axis of the tube $a$, i.e. the wall will be extruded into the opening $c$ to define the bulb $g$, indicated by a chain-dotted line.

The axial pressure F may be applied either at the ends of the terminal sections of a portion of tube $a$, or by means of clamp jaws, such as $h^1$ and $h^2$ shown schematically in FIG. 1, enclosing the tube on the outside, in which case the latter may be of any length. At the end of the operation it is found that only a slight thickening has occurred in the wall of the tube opposite the bulb $g$, the metal having risen towards the opening $c$.

The presence, in the part under treatment, of a space between the wall of the tube $a$ and the die makes it possible, as mentioned, during the operation of compression, to pass hot gases through the opening $c$ around the entire circumference of the tube $a$, and consequently to maintain the temperature in this region, thereby facilitating the operation, speeding it up, and making it possible to obtain a larger bulb $g$. For thick tubes, or tubes of larger diameter, means are available for heating the interior of the tube which remains empty, making it possible to continue heating the treated portion during compression.

Moreover, it is contemplated that, at the end of the operation, one may, if desired, pass a calibrating mandrel into the inside of the tube $a$ to render uniform the thickness and diameter of the tube in the treated region.

The fact that the operation is carried out without a mandrel, and without any kind of filling, and the fact that it is possible to apply the compression force by means of external jaws $h^1$ and $h^2$, make it possible to form a bulb at any portion of a tube, even of substantial length.

Furthermore, the straight tube with a bulb thus produced, having no appreciable variation in shape or extra thickening, may subsequently be bent over a roller, which results in a very regular bulbed curve.

As can be seen in FIG. 2, the opening $c$ provided in the die $b^1$, $b^2$ for the formation of the bulb is slightly widened beyond its base, so that the bulb $g$ will not come into direct contact with the walls of the opening but will leave a space $i$ which prevents the premature cooling of the extruded metal, which allows a bulb of greater height to be obtained.

It will be understood that various other changes and modifications in addition to those indicated above may be made in the embodiment herein described and shown in the drawing without departing from the scope of the invention as defined in the appended claims. It is intended, therefore, that all matter contained in the foregoing description and in the drawing shall be interpreted as illustrative only and not as limitative of the invention.

This is a division of my copending application Serial No. 594,474 filed June 28, 1956, now Patent No. 3,030,902.

What I claim and desire to secure by Letters Patent is:

A process of forming a bulb on a straight metal tube which comprises radially confining first axially spaced apart portions of said tube to prevent radial expansion of said portions and freeing at least one surface area of a second portion of said tube intermediate said first space-apart portions from radial confinement to allow radial expansion of said second portion, and applying axial pressure to said tube directed inwardly toward said second portion whereby to form the bulb in said second portion while said first portions of said tube are held against expansion by said pressure, different surface areas of said second portion being freed from said radial confinement by varying amounts with one surface area being entirely free of radial confinement and the remaining surface areas being sufficiently free to prevent chilling of the tube blank prior to application of said axial pressure, and heating said tube blank between said first portions with a flow of hot gases during application of said axial pressure.

References Cited in the file of this patent

UNITED STATES PATENTS

| | | |
|---|---|---|
| 1,886,831 | Murray | Nov. 8, 1932 |
| 1,946,117 | Sparks | Feb. 6, 1934 |